United States Patent
Sauer

(10) Patent No.: US 8,534,183 B2
(45) Date of Patent: Sep. 17, 2013

(54) LUBRICATING DEVICE FOR A LINEAR MOTION DEVICE

(75) Inventor: Rainer Sauer, Volkach (DE)

(73) Assignee: Robert Bosch GmbH, Stuttgart (DE)

( * ) Notice: Subject to any disclaimer, the term of this patent is extended or adjusted under 35 U.S.C. 154(b) by 739 days.

(21) Appl. No.: 12/782,803

(22) Filed: May 19, 2010

(65) Prior Publication Data

US 2011/0005386 A1 Jan. 13, 2011

(30) Foreign Application Priority Data

Jul. 9, 2009 (DE) .......................... 10 2009 032 345

(51) Int. Cl.
*F16H 25/20* (2006.01)
(52) U.S. Cl.
USPC ............................................. 92/156; 92/159
(58) Field of Classification Search
USPC ............... 91/46; 92/153, 156, 158, 159, 160; 184/6, 6.12, 6.14; 251/335
See application file for complete search history.

(56) References Cited

U.S. PATENT DOCUMENTS 3,049,103 A * 8/1962 Dumm ............................ 92/122
3,064,758 A 11/1962 Ohrnberger
3,595,100 A * 7/1971 Stark et al. ................... 74/89.43

FOREIGN PATENT DOCUMENTS

| DE | 1 219 310 | 6/1966 |
| DE | 195 49 719 | 9/2007 |
| DE | 10 2007 043 3 | 3/2009 |

* cited by examiner

*Primary Examiner* — Edward Look
*Assistant Examiner* — Logan Kraft
(74) *Attorney, Agent, or Firm* — Michael J. Striker

(57) ABSTRACT

A linear motion device includes a housing which extends in a longitudinal direction, and in which a rotor movable in the longitudinal direction is accommodated, the housing including a lubricant supply device, via which the rotor may be supplied with lubricant. The lubricant supply device includes a plunger mounted on the housing and movable transversely to the longitudinal direction, and a spring via which the plunger may be pushed against the rotor, to establish a lubricant supply connection to the rotor via the plunger.

3 Claims, 2 Drawing Sheets

LUBRICATING DEVICE FOR A LINEAR MOTION DEVICE

CROSS-REFERENCE TO RELATED APPLICATION

The invention described and claimed hereinbelow is also described in German Patent Application DE 10 2009 032 345.7 filed on Jul. 9, 2009. This German Patent Application, whose subject matter is incorporated here by reference, provides the basis for a claim of priority of invention under 35 U.S.C. 119(a)-(d).

BACKGROUND OF THE INVENTION

The present invention relates to a linear motion device.

A linear motion device is made known in DE 10 2007 043 391 A1. FIG. 1 of DE 10 2007 043 391 A1 shows a linear motion device 10 in the form of an electric cylinder. The linear motion device includes a tubular housing 30 that extends in a longitudinal direction 12 and is extruded out of aluminum. A ball screw spindle 11 is rotatably accommodated in the housing. The ball screw spindle is engaged in a threaded manner with a rotor 20 in the form of a recirculating ball nut, thereby enabling the rotor to move in the longitudinal direction via a rotation of the spindle. The rotor is fixedly connected to a tubular arm 23 that extends out of the housing on a longitudinal front side, thereby enabling it to be retracted and extended via a rotary motion of the spindle relative to the housing.

The disadvantage of this linear motion device is the complicated lubrication of the rotor in the form of a ball screw nut. For this purpose, a lubricant supply device in the form of a closeable opening is provided on the housing. To be lubricated, the rotor must be moved into a longitudinal position in which the aforementioned opening is located directly opposite a lubricant delivery bore in the rotor. In this position, lubricant may now be filled into the rotor via the lubricant delivery bore, using a grease gun. This lubricating procedure absolutely must be performed manually.

SUMMARY OF THE INVENTION

The object of the present invention is to create a lubricant supply device that may be used in an automated manner, in particular in conjunction with a central lubricating system.

According to the present invention, this object is attained by the fact that the lubricant supply device includes a plunger that is mounted on the housing and is movable transversely to the longitudinal direction, and that a spring is provided, via which the plunger may be pushed against the rotor. It is therefore possible to establish a lubricant supply connection to the rotor via the plunger.

The rotor may be moved into a longitudinal position in an automated manner, in which the plunger establishes a lubricant supply connection to the rotor, thereby making it possible to lubricate the rotor using a central lubricating system that is permanently connected to the plunger.

It should be noted that a linear motion device may typically be driven by an electric motor that is connected to a controller, thereby making it possible to move the linear motion device into various longitudinal positions in an automated manner. The linear motion device according to the present invention may therefore be lubricated in an automated manner.

The rotor may include a rotor sliding surface in which at least one lubricant delivery bore is provided; the plunger includes a plunger sliding surface that is situated parallel to the rotor sliding surface, and a lubricant channel that may be aligned with the lubricant delivery bore is located in the plunger. Since the plunger sliding surface and the rotor sliding surface are oriented parallel to one another, they may be moved relative to one another in the longitudinal direction. To this end, the two sliding surfaces are preferably flat in design. Via the aforementioned spring the two sliding surfaces are pressed tightly against one another, thereby making it possible for lubricant to be transferred from the lubricant channel into the lubricant delivery bore.

The plunger sliding surface and/or the rotor sliding surface may be coated with rubber. As a result, lubricant-tight contact between the plunger sliding surface and the rotor sliding surface is ensured.

The rotor may include an insertion bevel for the plunger, the plunger being located such that it may be moved via the insertion bevel transversely to the longitudinal direction. Via the insertion bevel, the plunger is moved from its maximally extended position into a working position, thereby enabling lubricant to be transferred from the plunger to the rotor.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
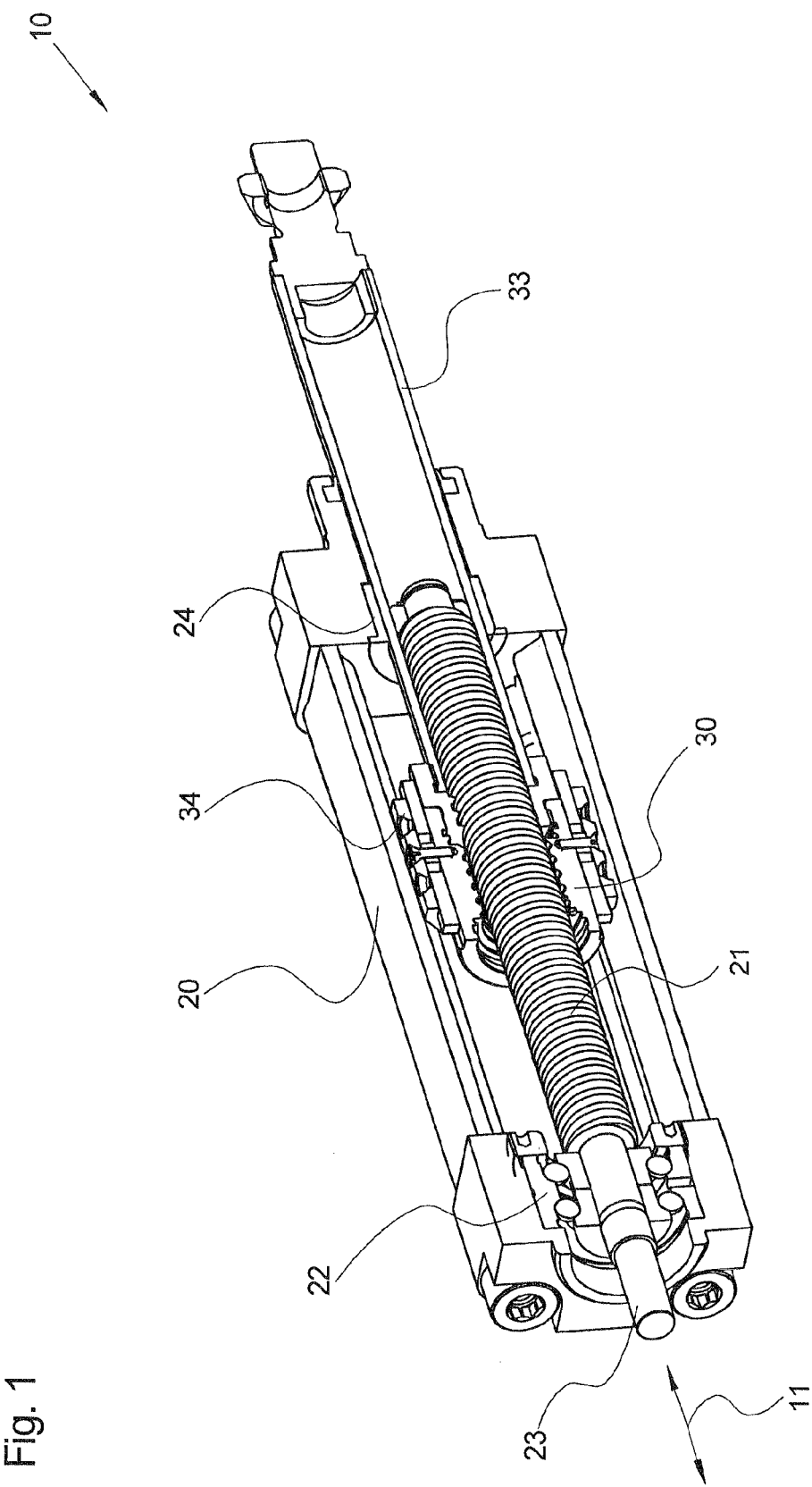
FIG. 1 shows a perspective sectional view of a linear motion device according to the present invention.

FIG. 1 shows a linear motion device 10 according to the present invention, in a sectional view, in which the cutting plane extends through the axis of rotation of spindle 21. Linear motion device 10 includes a housing 20 that extends in a longitudinal direction 11, and in which a spindle 21, i.e., a ball screw spindle, is accommodated. Spindle 21 is rotatably supported via a journal bearing 22 in the form of an angular ball bearing, journal bearing 22 being located adjacent to drive peg 23 of the spindle. Via drive peg 23, spindle 21 may be connected to an electric motor (not depicted) in order to set it into rotary motion.

Spindle 21 is engaged in a threaded manner with a rotor 30 in the form of a recirculating ball nut. Recirculating ball nut 30 is secured against rotation relative to housing 20 via a rotation lock 34 according to DE 10 2007 043 391 A1, thereby enabling it to be moved in longitudinal direction 11 via a rotation of spindle 21. Rotor 30 is fixedly connected to an arm 33 that extends out of housing 20 on the longitudinal end that faces away from drive peg 23, thereby enabling it to be retracted and extended relative to housing 20. The motion of tubular arm 33 is guided by a guide bush 24.

Figure 2:
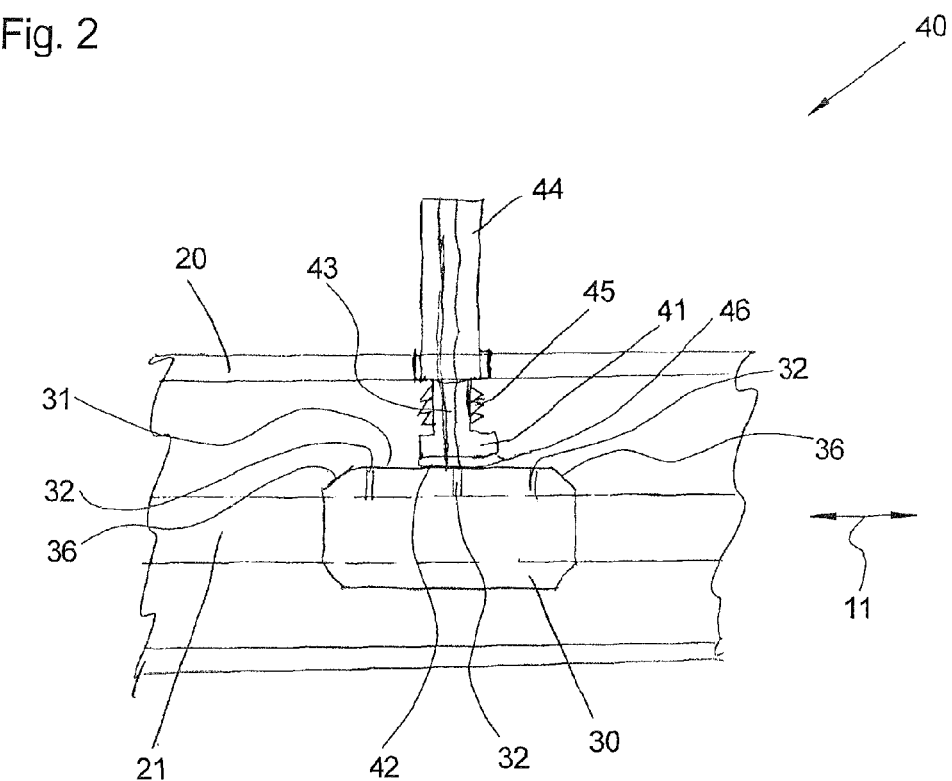
FIG. 2 shows a basic schematic depiction of a lubricant supply device according to the present invention.

Lubricant supply device 40 according to the present invention is depicted in a basic schematic manner in FIG. 2. Lubricant supply device 40 includes a plunger guide 44 which is fixedly connected to housing 20, and which may be connected to a central lubricating system (not depicted). A plunger 41 is guided in plunger guide 44 in a sliding manner transversely to longitudinal direction 11. A spring 45 that pushes plunger 41 in the direction of rotor 30 is located between plunger 41 and housing 20. A flat rotor sliding surface 31, which is situated parallel to longitudinal direction 11, is provided on the steel main body of rotor 31. Plunger 41 has a flat plunger sliding surface 42 that is coated with rubber 46. Plunger sliding surface 42 is oriented parallel to rotor sliding surface 31, and so they bear against one another via their entire area, and therefore tightly, in the working position of lubricant supply device 40 shown.

A lubricant channel 43 is provided in the center of plunger 41 and may be oriented, via a suitable longitudinal displacement motion of rotor 30, in alignment with one of the three lubricant delivery bores 32. A related position of the linear motion device is shown in FIG. 2. In this working position, it is now possible to pump lubricant, lubricating grease in particular, in an automated manner from the aforementioned central lubricating system via lubricant channel 43 and one of the lubricant delivery bores 32 into rotor 30, thereby adequately lubricating rotor 30.

Mention should also be made of slanted insertion bevel 35 on rotor 30, via which plunger 41 may be moved via a longitudinal motion of rotor 30 transversely to longitudinal direction 11, thereby enabling it to be moved from a maximally extended position into the working position. The maximally extended position of plunger 41 is defined by a stop (not depicted) in plunger guide 44, the stop being located such that plunger sliding surface 42 is taken hold of by insertion bevel 35 when rotor 30 moves past plunger 41. To ensure that the stated procedure may take place independently of the direction of motion of rotor 30, an insertion bevel 35 is provided on each of the two longitudinal ends of rotor 30.

It will be understood that each of the elements described above, or two or more together, may also find a useful application in other types of constructions differing from the types described above.

While the invention has been illustrated and described as embodied in a lubricating device for a linear motion device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A linear motion device, comprising:
a housing extending in a longitudinal direction;
a rotor accommodated in said housing and movable in said longitudinal direction, said housing including a lubricant supply device for supplying said rotor with lubricant, said lubricant supply device including a plunger mounted on said housing and movable transversely to said longitudinal direction;
a spring pushing said plunger against said rotor, and via said plunger a lubricant supply connection to the rotor is established, wherein said rotor has an insertion bevel for said plunger, said plunger being oriented such that it is moved via said insertion bevel in said longitudinal direction.

2. The linear motion device as defined in claim 1, wherein said rotor includes a rotor sliding surface in which at least one lubricant delivery bore is provided, said plunger including a plunger sliding surface situated parallel to said rotor sliding surface, and said plunger has a lubricant channel aligned with said lubricant delivery bore.

3. The linear motion device as defined in claim 2, wherein at least one of said plunger sliding surface and said rotor sliding surface is coated with rubber.

* * * * *